(12) United States Patent
Hilkemeyer et al.

(10) Patent No.: US 8,489,448 B2
(45) Date of Patent: *Jul. 16, 2013

(54) SYSTEM, METHOD AND PROGRAM TO ESTIMATE COST OF DISTRIBUTING SOFTWARE

(75) Inventors: Gerhard Hilkemeyer, Vail, AZ (US); Mickey Iqbal, Plano, TX (US); Robert Laurence Johanns, Fuquay Varina, NC (US); Vernon Lenzini, Cottleville, MO (US); Robin McCubbin, Etobicoke (CA); Patrick Francis Trees, Saugerties, NY (US)

(73) Assignee: International Business Machines Corporation, Armonk, NY (US)

( * ) Notice: Subject to any disclaimer, the term of this patent is extended or adjusted under 35 U.S.C. 154(b) by 0 days.

This patent is subject to a terminal disclaimer.

(21) Appl. No.: 13/448,571

(22) Filed: Apr. 17, 2012

(65) Prior Publication Data

US 2012/0221490 A1    Aug. 30, 2012

Related U.S. Application Data

(63) Continuation of application No. 13/168,413, filed on Jun. 24, 2011, now Pat. No. 8,195,502, and a continuation of application No. 11/067,427, filed on Feb. 24, 2005, now abandoned.

(51) Int. Cl.
| | |
|---|---|
| *G06Q 10/00* | (2012.01) |
| *G06Q 30/00* | (2012.01) |
| *G06F 17/00* | (2006.01) |
| *G06G 7/00* | (2006.01) |

(52) U.S. Cl.
USPC .................................. 705/7.35; 705/400

(58) Field of Classification Search
USPC ................................. 705/7.35, 400
See application file for complete search history.

(56) References Cited

U.S. PATENT DOCUMENTS

| | | |
|---|---|---|
| 5,189,606 A | 2/1993 | Burns et al. |
| 5,291,397 A | 3/1994 | Powell |
| 5,765,140 A | 6/1998 | Kundson et al. |

(Continued)

OTHER PUBLICATIONS

Yu, Weider D. "A Modeling Approach to Software Cost Estimation" IEEE Journal on Selected Areas in Communications. vol. 8. No. 2. Feb. 1990.*

(Continued)

*Primary Examiner* — John Hayes
*Assistant Examiner* — Allen J Jung
(74) *Attorney, Agent, or Firm* — Arthur J. Samodovitz

(57) ABSTRACT

Estimating the cost of an ESD for software and subsequent updates for the software. First program instructions determine a cost of the ESD associated with packaging together components of the software. Second program instructions receive a selection from an operator whether to push or pull the subsequent updates to a customer, and determine a cost for distributing the subsequent updates based on the selection. Third program instructions estimate a cost of the ESD associated with a type of program used by the customer to create images of the software. Fourth program instructions estimate a cost of the subsequent updates associated with distributing the updates to a remote distribution site.

8 Claims, 4 Drawing Sheets

U.S. PATENT DOCUMENTS

| | | | |
|---|---|---|---|
| 5,878,400 | A | 3/1999 | Carter, III |
| 5,918,219 | A | 6/1999 | Isherwood |
| 6,061,657 | A | 5/2000 | Whiting-O'Keefe |
| 6,072,479 | A | 6/2000 | Ogawa |
| 6,199,193 | B1 | 3/2001 | Oyagi et al. |
| 6,219,930 | B1 | 4/2001 | Reid |
| 6,263,345 | B1 | 7/2001 | Farrar et al. |
| 6,360,255 | B1 | 3/2002 | McCormack et al. |
| 6,393,290 | B1 | 5/2002 | Ufongene |
| 6,421,671 | B1 | 7/2002 | Bryan et al. |
| 6,446,053 | B1 | 9/2002 | Elliot |
| 6,477,518 | B1 | 11/2002 | Li et al. |
| 6,513,154 | B1 | 1/2003 | Porterfield |
| 6,658,643 | B1 * | 12/2003 | Bera .................. 717/101 |
| 8,145,579 | B2 | 3/2012 | Iqbal |
| 2002/0026342 | A1 | 2/2002 | Lane et al. |
| 2005/0278518 | A1 * | 12/2005 | Ko et al. ................ 713/1 |
| 2006/0080656 | A1 | 4/2006 | Cain et al. |
| 2006/0190417 | A1 | 8/2006 | Hilkemeyer et al. |
| 2011/0258143 | A1 | 10/2011 | Hilkemeyer et al. |

OTHER PUBLICATIONS

Non-Final Office Action dated Feb. 19, 2008 for U.S. Appl. No. 11/067,427.

Final Office Action dated Jul. 24, 2008 for U.S. Appl. No. 11/067,427.

Gutjahr, WJ; "Optimal Test Distributions for Software Failure Cost Estimation", 1994.

Yu, WD; "A Modeling Approach to Software Cost Estimation", 1990.

Schooff, RM et al; "Dynamic Multistage Software Estimation" 1999.

Merwin, RE; "Estimating Software Development Schedules and Costs", 1975.

Morris III, DG; "Accurate Data Redistribution Cost Estimation in Software Distributed Shared Memory Systems", 2001.

Musilek, P et al; "Software Estimation with Fuzzy Models", 2000.

Briand, LC et al.; "COBRA: A Hybrid Method for Software Cost Estimation Benchmarking & Risk Assessment", 1998.

Notice of Allowance dated Feb. 3, 2012 for U.S. Appl. No. 13/168,413.

* cited by examiner

FIG. 2

For selected combination of software toolset

| Function | Skill Level | labor in hrs |
|---|---|---|
| Image Builder | expert | C2. Number of hours to build base image |
| Image Tester | expert | C4. Number of hours to perform basic testing of an image |
| Integration Tester | expert | C6. Number of hours to test an image |
| CD creation/Test & Doc | expert | C8. Number of hours to create and test CDs and create documentation |
| Project Management | expert | C10. % of Total Hours |
| Adv Tech Leadership | expert | C12. % of Total Hours |
| Packager | expert | C14. Number of hours to package standard applications (each)   C15. % of standard package |
| | | C16. Number of hours to package a complex application   C17. % of complex package |
| | | C18. Number of hours to package an average application   C19. % of average package |
| | | C20. Number of hours to package a simple application or data file C21. % of simple package |
| Package Tester | expert | C23. Number of hours to perform basic package testing/test standard application |
| | | C24. Number of hours to test a complex application |
| | | C25. Number of hours to test an average application |
| | | C25. Number of hours to test a simple application or data files |
| Image Updater (OS) | expert | C28. Number of hours to update an existing base OS image |
| Image Updater (Apps) | expert | C30. Number of hours to update existing base OS image with Std Apps |
| Distribution Verifier | expert | C32. Number of hours to verify a package works with distribution tool |
| Documentation | expert | C34. Number of hours to document a package |
| Distribution Tech | expert | C36. Number of hours to distribute a standard application (before premium) |
| | | C37. Number of hours to distribute a complex application (before premium) |
| | | C38. Number of hours to distribute an average application (before premium) |
| | | C39. Number of hours to distribute a simple application or data files (before premium) |

Managed Distribution Premium
- 1-500    C40.
- 501-2000    C41.
- 2001-3500    C42.
- 3501-5000    C43.
- 5001-10000    C44.
- 10001-20000    C45.

FIG. 3

Imaging

| # | Item | Value | Notes |
|---|---|---|---|
| | | | Blue areas are for input |
| I1. | Number of hardware models requiring Win95 support | 3 | A scripted install will need to be created for each legacy OS/hardware combination. Each image requires a separate Ghost image to be maintained |
| I2. | Number of hardware models requiring Win98 support | 3 | |
| I3. | Number of hardware models requiring WinNT4 support | 4 | |
| I4. | Number of Windows 2000/XP images | 2 | Minimum one base image is required for Desktop and for Laptop for Windows 2000/XP |
| I5. | Number of standard applications (included w/image) | 9 | Standard applications are part of the Base Image and installed on all PCs. Usually volume or site license exists for the application |
| I6. | Number of image refreshes per year | 2 | |
| I7. | Number of additional commercial shrinkwrap applications | 10 | The number of additional applications that need to be packaged and included as part of the "Super Image". Commercial shrinkwrap - not custom type apps. This section is for vendor written or custom home grown applications for specific Business Units that need to be packaged and integrated into the image |
| I8. | Bus Unit #1 Power User | | Business Unit Configs result in additional images because applications need to integrated with the image therefore a separate image needs to maintained |
| I9. | Number of complex packages | 3 | |
| I10. | Number of average packages | 2 | |
| I11. | Number of simple packages | 1 | |
| I12. | Bus Unit #2 Developer | | Power User, Developer, and Admin Assist are example names and should be renamed as appropriate |
| I13. | Number of complex packages | 2 | |
| I14. | Number of average packages | 3 | |
| I15. | Number of simple packages | 4 | |
| I16. | Bus Unit Cfg #3 Admin Assist | | Note: |
| I17. | Number of complex packages | 4 | Business Unit configs are for Win2K and XP only. |
| I18. | Number of average packages | 2 | Of special configs are needed for legacy OS images, increment the |
| I19. | Number of simple packages | 2 | total number of hardware platforms requiring support by each number |
| I20. | Bus Unit Cfg #4 none | | of special configs needed |
| I21. | Number of complex packages | 3 | |
| I22. | Number of average packages | 4 | |
| I23. | Number of simple packages | 6 | |
| I24. | Total number of Windows 2000/XP images | 10 | |
| I25. | Total number of legacy OS images | 10 | |

FIG. 3 (cont'd)

Packaging and Distribution

I26. Annual number of software update packages    40
I27. Total number of PCs receiving distributions    25000

Distributions:

I28. 1-500
I29. 501-2000
I30. 2001 - 3500
I31. 3501 - 5000
I32. 5001 - 10000
I33. 10001 - 20000
I34. 20001 - 30000
I35. 30001 - 40000
I36. 40001 - 50000

Managed Distribution Premium:

Enter the number of yearly distributions to each target audience size. The sum total listed should equal the number of packages that are planned for the year. e.g. If you anticipate sending 24 packages to the entire enterprise of a 16,000 seat environment, and also distributing 12 packages to business units of 1,000 seats, enter the following:

10
   10
   20

24 in line I32
12 in line I28

SYSTEM, METHOD AND PROGRAM TO ESTIMATE COST OF DISTRIBUTING SOFTWARE

CROSS REFERENCE TO RELATED APPLICATION

This is application is a Continuation Application of pending U.S. patent application Ser. No. 13/168413 filed Jun. 24, 2011 and now U.S. Published Patent Application No. 2011-0258143 A1.

BACKGROUND OF THE INVENTION

The invention relates generally to computer systems, and deals more particularly with a technique to estimate the cost of electronically distributing and maintaining software.

It is well known today to electronically distribute software via the Internet or other network. There are many factors effecting the complexity of the distribution including: (a) the requisite number of workstation and server images that need the software, (b) whether these are first time installation of the software, (c) the requisite number of application updates, operating system patches/fixes and security updates, (d) the amount and type of data that is associated with the software and must be distributed with the software, (e) the difficulty of installation, configuration, deployment and maintenance of the software applications, operating system, software packaging tools, software distribution tools and image maintenance tools, (f) the complexity of the network topology, network architecture and existing IT infrastructure and (g) any given network or systems infrastructure constraints that may impact a desired initial electronic software distribution ("ESD") environment. Each of these requirements affects the cost of the ESD. An estimate of the cost for the initial distribution and subsequent maintenance may be required ahead of time.

Various manual and semi-automated methods were known for estimating the cost of an initial ESD. The known manual method begins with a specification of what services and products are required for the initial ESD. The overall cost of the ESD is determined based on the cost of parts and labor for each service and product, and a summation of these costs. Strategic service companies also generate bids for ESD and subsequent maintenance using a combination of manual data collection and data entry, and then computations based on this data using spreadsheet or similar calculation tools. For example, semi-automated methods calculate costs, using a program tool such as Lotus 123 or MS Excel spreadsheet program, where the various cost elements have already been identified. Once the user enters data for these variables, the spreadsheet program tool calculates the costs.

Other, more automated methods were also known for estimating the cost of performing electronic software distributions and subsequent maintenance/distribution of software updates. These methods use macros which further automate the processing of spreadsheet program tools such as those described above, with the major difference that each automated method is specific to a particular ESD tool. The macros automate calculations such as those that show a specific tool's license costs may be calculated for any given number of workstations or servers, or how many labor hours it would take to package and distribute a specific number of shrink-wraps application using a specific tool.

Other automated and semi-automated methods were known for estimating costs for various types of products and services. See U.S. Pat. No. 5,291,397 entitled "Method for Resource Allocation and Project Control for the Production of a Product", U.S. Pat. No. 5,918,219 entitled "System and method for estimating construction project costs and schedules based on historical data", U.S. Pat. No. 6,446,053 entitled "Computer-implemented method and system for producing a proposal for a construction project", U.S. Pat. No. 6,477,518 entitled "Method of knowledge-based engineering cost and weight estimation of an HVAC air-handling assembly for a climate control system", U.S. Pat. No. 6,393,290 entitled "Cost based model for wireless architecture", U.S. Pat. No. 6,061,657 entitled "Techniques for estimating charges of delivering health care services that take complicating factors into account", U.S. Pat. No. 6,012,054 entitled "Database system with methods for performing cost-based estimates using spline histograms", U.S. Pat. No. 6,219,930 entitled "Apparatus and method of use for calculating an estimate of damaged surface repair cost", U.S. Pat. No. 6,353,826 entitled "Database system with methodology providing improved cost estimates for query strategies", U.S. Pat. No. 6,263,345 entitled "Histogram synthesis modeler for a database query optimizer", U.S. Pat. No. 6,072,479 entitled "Multimedia scenario editor calculating estimated size and cost", and U.S. Pat. No. 5,189,606 entitled "Totally integrated construction cost estimating, analysis, and reporting system".

An object of the present invention is to automate the process of estimating the cost of an initial ESD.

Another object of the present invention is to automate the process of estimating the cost of subsequent maintenance.

Another object of the present invention is to automate the process of estimating the cost of an initial ESD while considering a wide range of factors which affect the cost.

SUMMARY OF THE INVENTION

The invention resides in a system and computer program product for estimating the cost of an ESD for software and subsequent updates for the software. Various cost factors can be considered such as one or more of the following. First program instructions determine a cost of the ESD associated with packaging together components of the software. Second program instructions receive a selection from an operator whether to push or pull the subsequent updates to a customer, and determine a cost for distributing the subsequent updates based on the selection. Third program instructions estimate a cost of the ESD associated with a type of program used by the customer to create images of the software. Fourth program instructions estimate a cost of the subsequent updates associated with distributing the updates to a remote distribution site, and then distributing the updates from the remote distribution site to the customer based on a type of customer tool used to download the updates from the remote distribution site. Fifth program instructions sum together the various costs.

BRIEF DESCRIPTION OF THE FIGURES

FIG. 2 illustrates a specific (screen interface) example of rules, facts and data which can be entered and stored in a knowledge base within the cost estimating program of FIG. 1 to estimate the cost of an initial ESD and subsequent maintenance.

FIG. 3 illustrates another, specific (screen interface) example of rules, facts and data which can be entered and stored within the knowledge base within the cost estimating program of FIG. 1 to estimate the cost of an initial ESD and subsequent maintenance.

DETAILED DESCRIPTION OF THE PREFERRED EMBODIMENTS

Figure 1:
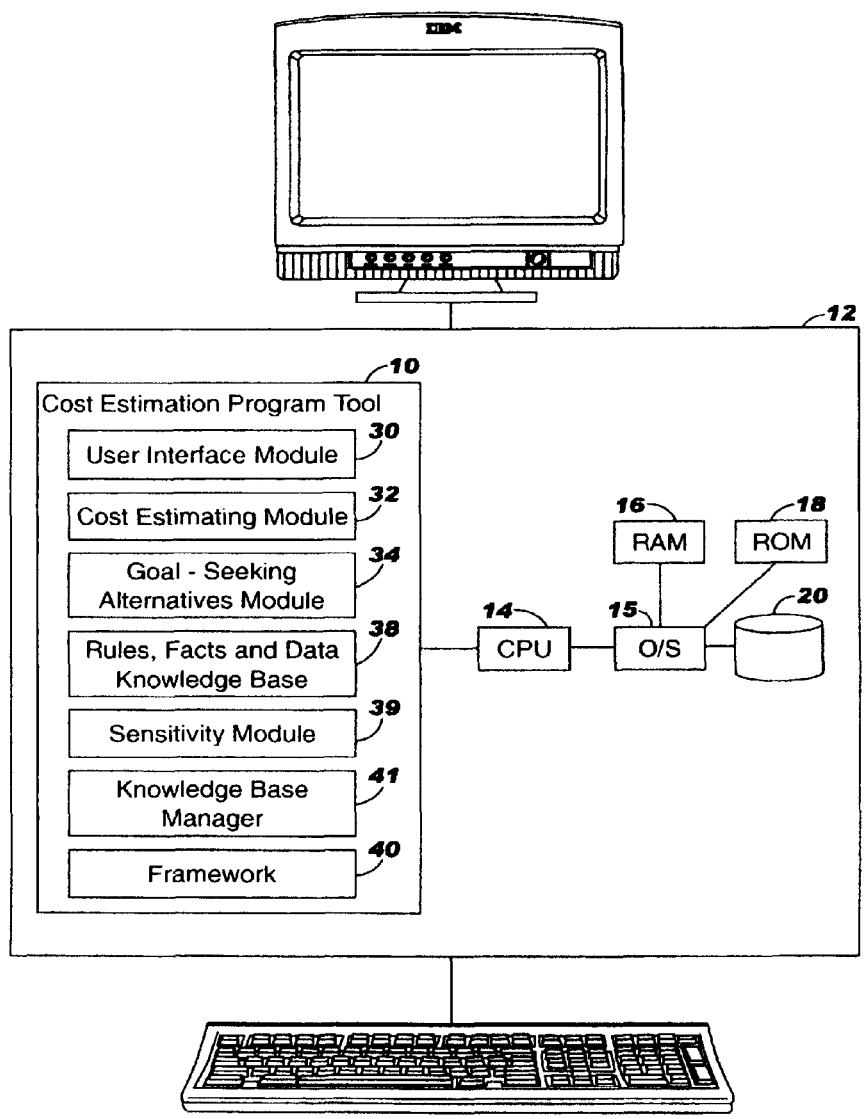
FIG. 1 is a block diagram illustrating a computer system which includes a cost estimation program according to the present invention.

The present invention will now be described in detail with reference to the figures. FIG. 1 illustrates a cost estimation program 10 executing in a computer 12 to estimate the cost of an initial ESD and subsequent maintenance. Computer 12 is a standard type such as a known workstation or server, and includes a CPU 14, operating system 15, RAM 16, ROM 18 and disk storage 20. Cost estimation program 10 includes a user interface program module 30, a cost estimating program module 32, a goal-seeking alternatives program module 34, a rules, facts and knowledge database 38, a sensitivity program module 39, a knowledge database manager program module 41, and a systems framework program module 40. The user interface module 30 allows a knowledge engineer to enter customer requirements. The customer requirements determine the unique ESD environment variables and needs (such as number of workstations and servers, type of network used, types of applications requiring upgrades, etc.) for the initial ESD and subsequent ESD maintenance for each customer. The user interface module 30 also allows a knowledge engineer to enter rules, facts and data into the knowledge database 38 which can then be used by the cost estimating module to estimate the cost of an initial ESD and subsequent maintenance. The user interface module 30 also allows a subsequent operator to specify other customer requirements that impact the cost of the initial ESD and subsequent maintenance. The knowledge engineer and subsequent operator can designate the customer requirements as "soft" or "hard". The cost estimating module 32 applies the rules, facts and data in the knowledge database 38 to the customer requirements to determine labor, hardware, software and infrastructure costs. The goal-seeking alternatives module 34 relaxes customer requirements, which the operator indicated as "soft", to meet a "hard" budget constraint. The sensitivity module 39 allows the operator to change one or a few customer requirements, identifies the rules which are affected by the change(s), and then notifies the cost estimating module 32 to recompute the cost associated with the effected rules. (This avoids the need for the cost estimating module 32 to recompute all the component costs.) The database manager module 41 manages the data, facts and rules in the knowledge database 38. The systems framework module 40 logically interconnects the user interface module 30, cost estimating module 32, alternatives module 34, knowledge database 38 and knowledge database manager 41. Systems framework module 40 can be implemented in a variety of programming languages, such as JAVA, to provide multiple operating system support, multiple hardware support, distributed objects and multi-language support. The systems framework module 40 also can be installed and configured to operate in a multi-tier systems architecture, where the various program modules and database may actually reside on different computer systems interconnected via a distributed network computing architecture.

The rules, facts and data entered by the knowledge engineer and stored in the knowledge database 38 (in RAM 16 or ROM 18) include the following:

(a) installation, configuration, deployment and maintenance features (for example, directories where filesets may be installed, parameters that should be passed on during installation in order to configure an operating system software, the type of deployment mechanism (PUSH, PUL or MEDIA based) that should be used and the frequency and number of patches that need to be applied over time) of various workstation and server operating systems;

(b) installation, configuration and deployment features (for example, prerequisites that need to be installed prior to installing a packaging tool application, user interface changes or desktop setting changes, and interfaces with programming languages, instructions for performing rollbacks or checkpoint restarts during deployment) of viable software packaging tools and packaging methodologies;

(c) installation, configuration and deployment features (for example, how many distribution points to set up for a given network environment, how to configure and tune distribution parameters given a set of target workstations and servers and how many infrastructure servers hosting package repositories need to be deployed in a given environment) of viable software distribution tools;

(d) installation, configuration and deployment features (for example, whether CID installation or native setup installation or bare metal image build installation will be needed, what core packages will be configured as part of the base image build and what type of deployment methodology or tool such as IBM Remote Deployment Manager program may be used) of viable workstation image creation and workstation image maintenance tools;

(e) installation, configuration and deployment features (for example, LAN or WAN installation requirements such as bandwidth, coverage area, routers, firewall rules, port settings, etc., cabling and closets used, points of deployment of network routers and gateways, etc.) of available network topology, network architecture, existing IT infrastructure and existing network or systems infrastructure constraints that may impact a desired initial ESD environment;

(f) estimated cost for performing specific distribution and maintenance tasks;

(g) historical cost data from previous initial ESDs and maintenance activities, where the cost data is correlated with respective services;

(h) facts and business rules related to utilization of combinations of available software packaging/distribution and image creation/management tool-sets;

(i) rules to establish which packaging tools and methodologies can be used in a given environment;

(j) rules to establish which distribution tools and methodologies can be used in a given environment; and (k) rules to establish which image build tools and methodologies can be used in a given environment and rules to establish which combinations of various packaging tools, distribution tools and imaging tools may be used together in a given systems environment.

The following is a specific example of rules, facts and data, which can be stored within the knowledge database 38 to estimate the cost of an initial ESD and subsequent maintenance:

WiseInstaller software license fee/copy=$ X

Cost of Server "XJKC %ˆ&P32" manufactured by Vendor 'P'=$Y

Effort required to create automatically installable software packages/media of medium complexity by worker of skill level 'intermediate'=H hours Effort required to create automatically installable software package/media of medium complexity by worker of skill level 'expert'=(H×0.75) hours MS Windows software license fee/copy for enterprise between 1000 and 3000 workstations=$R initial ESD Tool-set A can provide both "Push" and "Pull"' based distribution capability.

SD Tool-set B can provide "Push" based distribution capability.

initial ESD Tool-set C can provide "Pull" based distribution capability.

Imaging tool 'TUX456RS' can create a single image spanning multiple NLS languages, hardware drivers, hardware models and business unit applications.

FIG. 2 illustrates another, specific example of rules, facts and data which can be stored in the knowledge database 38 to estimate the cost of an initial ESD and subsequent maintenance. A developer enters the rules, facts and data for the number of hours of labor for each function. These are fields C2-C45.

FIG. 3 illustrates another, specific example of rules, facts and data which can be stored within the knowledge database 38 to estimate the cost of an initial ESD and subsequent maintenance. As shown in FIG. 3, a knowledge engineer already entered the rules, facts and data for the numbers of various types of units. These are the fields in the middle column of FIG. 3, where examples of numbers are shown.

The following is an example of other, specific (business) rules within the knowledge database 38. These rules are encoded using a computer programming language which enables the cost estimating module 32 to automatically access and process the rules and apply them to the customer requirements.

initial ESD distribution tool 'A' cannot be used in conjunction with package creation tool 'T'.

If tools 'A' or tools 'B' are used in an ethernet based network environment, the following business constraints/rules will need to be addressed as part of initial ESD environment implementation and maintenance operation:

Obtain change management concurrence for installing and configuring tool A or tool B in an ethernet network environment (3 hrs).

Install tool A or tool B on initial ESD Central Server (4 hrs using intermediate skill level, 3 hrs using expert skill level).

Configure tool A or tool B to work in an ethernet network environment (4 hrs using intermediate skill level, 3 hrs using expert skill level).

Perform system validation test to ensure functionality of tool A or tool B (2 hrs using intermediate skill level, 0.5 hrs using expert skill level).

Imaging tool 'DFX577IO' can create a single image spanning hardware drivers, hardware models and business unit applications with O/S Win 2000 and Win XP only.

Effort to apply maintenance updates to Legacy O/S is dependent on the number of Legacy OS Images and the labor hours required to update an Image and the number of updates per year.

Image problem management effort is dependent on the number of trouble tickets; the number of workstations and distribution failure rate and the number of images.

initial ESD packaging tool-set "G" cannot create packages which require updates to the "Current—User Registry Hive" of a Windows NT based Image.

Applications "H65", "G75" and "U89" cannot be installed on a Win 95 or Win 98 image using an automated "silent installation methodology" unless packaging tool "X3" is used to package these applications. "Silent installation methodology" means that an end user on whose desktop a package is being installed does not need to input any parameters while the installation is taking place and that the installation may in fact take place in the background so that the user's work does not get interrupted.

Applications "H65", "G75" and "U89" cannot be installed on a Win 2000 or Win XP image using an automated "silent installation methodology" unless packaging tool "F" is used to package these applications.

Historically, whenever application "H65" has been installed electronically using tool "X5" in a 5000 workstation plus environment, 0.25% of distributions have had to be resubmitted because of registry based issues hence adding x % to the cost of an initial distribution.

The customer requirements (subsequently entered by an operator to define a proposed initial ESD and subsequent maintenance) include details about the customer's current workstation environment, which may or may not have an existing initial ESD capability. The following are examples of possible customer requirements that the customer specifies to cost estimation program tool 10:

(a) number (desktop and mobile), hardware type, operating system type, image type and current locations of workstations;

(b) technology refresh cycle period for workstations and how the refresh applies, % age-wise, over time to the number of existing workstations;

(c) components (operating system, network protocol, hardware drivers and software applications) included in each existing image;

(d) network connections details, if any exist, between locations where the respective workstations are located (an abstract level network diagram can be generated graphically using the user interface component based on the user's input);

(d) number of electronic or manual software updates made annually per workstation in the existing environment;

(e) number of electronic or manual software updates made annually per workstation in the existing environment broken down by the level of complexity of each update (where the levels of complexity are defined for the user, and the user is guided by the user interface module in selecting complexity levels for respective software updates using system help and examples);

(f) logical grouping and listing of the existing set of software applications across existing organizational business units, i.e. the assignment of the applications to these logical groupings, number of servers per organizational unit, and server locations supporting any existing initial ESD infrastructure environment. For example, there may be a total of one hundred total applications, where ten applications are dedicated to a marketing business unit, and ten applications, including two of those used by marketing unit, are used by a finance business unit, etc.;

(g) details of hardware, operating system, installed software applications and network configurations for any server supporting an existing initial ESD infrastructure environment;

(h) list of software applications in the existing environment along with details about each application, such as number of workstations on which an application is installed, DASD requirements, version number, license limit, any required prerequisites, and logical business units to which an application is assigned;

(i) number of existing languages supported by the current workstation images and operating system;

(j) number of existing languages supported per software application in the current environment;

(k) skill levels (defined by cost estimation program tool 10) of available staff, and number of staff available to support initial ESD and maintenance based on required skill levels;

(l) components (i.e. operating system, network protocol, hardware drivers and software applications) to be included in each workstation image in the desired environment;

(m) network connection preferences between each of the locations where the workstations are to be located in the desired initial ESD environment; (the user interface module can generate an abstract-level network diagram based on the user's input);

(n) estimated number of electronic software updates to be made annually per workstation in the desired initial ESD environment broken down by the level of complexity of each update (where cost estimation program tool 10 defines the levels of complexity);

(o) preferred types of servers and their hardware vendor choice, operating system, etc. required to support the desired initial ESD environment;

(p) hardware configuration, operating system, installed software applications, and network configurations for any server supporting the desired initial ESD environment;

(q) languages to be supported on the desired initial ESD environment's workstation images and operating system;

(r) languages to be supported by the software applications in the desired initial ESD environment;

(s) software packaging tool (where the cost estimation program tool 10 provides recommendations about functionality, capabilities and license cost of several commercially available tools) for the desired initial ESD environment;

(t) software distribution tool (where the cost estimation program tool 10 provides recommendations about functionality, capabilities and license cost of several commercially available tools) for the desired initial ESD environment;

(u) image creation and image management tool (where the cost estimation program tool 10 provides recommendations about functionality, capabilities and license cost of several commercially available tools) for the desired initial ESD environment;

(v) either "push" distribution where the initial ESD occurs automatically when new applications or updates are available, or "pull" distribution where each initial ESD occurs when the customer requests it (after notification that a new software update is available);

(w) level of service (where the cost estimation program tool 10 provides definitions of various levels) for backup and disaster recovery of initial ESD infrastructure servers, such as frequency and scope of backups;

(x) level of service (where the cost estimation program tool 10 provides definitions of various levels) for backup and disaster recovery of initial ESD network infrastructure (excluding servers) such as frequency and scope of backups;

(y) selection of software package testing and quality assurance level of service (where the cost estimation program tool 10 defines different levels along with an indication of comparative labor costs);

(z) testing and quality assurance level of service for "golden images", i.e. core programs (where the cost estimation program tool 10 defines different levels along with an indication of comparative labor costs);

(aa) whether an internal desk side services organization will deploy and maintain images or whether the end user is provided with an automated means for installing or rebuilding an image on their personal workstation;

(bb) whether the end users will install the images in their workstations or whether the workstations will be transported to an interim service department to install the images;

(cc) image and software package distribution change management level of service (where the cost estimation program tool 10 defines the different levels defined and an indication of comparative labor costs);

(dd) an estimate of a minimum tolerable time period as well as a maximum allowable time period within which the desired initial ESD environment must be implemented;

(ee) an estimate of a minimum time period as well as a maximum allowable time period over which the new initial ESD environment will need to be managed;

(ff) inclusion of process overhead premium costs based on internationally recognized initial ESD environment implementation and maintenance; and (gg) fully burdened labor rates for each skill level required for subsequent maintenance.

The cost estimating module 32 estimates the cost of a proposed initial ESD "f(x)" and subsequent maintenance "f(y)":

Let $f(x)$=initial ESD cost (including setup, transition and electronic distribution of the then current version of software) based on a given set of customer requirements. The initial ESD cost, $f(x)$, is also called the "transition" cost in the equations and elsewhere in this patent application.

Let $f(y)$=cost of subsequent maintenance for the initial ESD i.e. excluding $f(x)$, based on a given set of customer requirements. The cost of subsequent maintenance, $f(y)$, is also called the "steady state" cost in the equations and elsewhere in this patent application.

The estimated cost for the initial ESD and subsequent maintenance is called $f(z)$, where $f(z)=f(x)+f(y)$.

The following is a generalized form of an algorithm within the cost estimating module 32, which calculates both $f(x)$ and $f(y)$ to produce $f(z)$ based on a given set of customer requirements, and the rules, facts and data embedded in the knowledge database 38. The following algorithm assumes that all rules, facts and data and customer requirements have already been input and stored in the knowledge database 38.

Let HW t=Hardware costs during "transition" (or "initial ESD").

Let HWS=Hardware costs during "steady state" (or "subsequent maintenance").

Let SWt=Software costs during transition.

Let SWs=Software costs during steady state.

Let Pkgt=Software packaging labor costs during transition.

Let Pkgs=Software packaging labor costs during steady state.

Let EDt=Electronic Distribution labor costs during transition.

Let EDs=Electronic Distribution labor costs during steady state.

Let ImgCt=Image creation labor costs during transition.

Let ImgCs=Image creation labor costs during steady state.

Let ImgMt=Image maintenance labor costs during transition.

Let ImgMs=Image maintenance labor costs during steady state.

Let Tt=Transition duration.

Let St=Steady State duration.

Then, $f(x)$ is a function of the following costs:

$f(x)=f$ (HW t, SWt, Pkgt, EDt, ImgCt, ImgMt, Tt)

$f(y)$ is a function of the following costs:

$f(y)=f$ (HW s, SWs, Pkgs, EDs, ImgCs, ImgMs, St)

The costs, which are components of f(x) and f(y) can be further broken down as follows:

Let Wkst t=number of workstations required during transition for production environment.

Let Wkst t-lab=number of workstations required during transition for initial ESD lab environment.

Let Wkst s=number of workstations required during steady state for production environment.

Let Wkst s-lab=number of workstations required during steady state for initial ESD lab environment.

Let Serv t=number of servers required during transition for initial ESD infrastructure production environment.

Let Serv t-lab=number of servers required during transition for initial ESD lab infrastructure environment.

Let Serv s=number of servers required during steady state for initial ESD infrastructure production environment.

Let Serv s-lab=number of servers required during steady state for initial ESD lab infrastructure environment.

Let Med t=cost of media, such as CDs, DVDs, USB devices etc., required during transition for initial ESD environment.

Let Med s=cost of media, such as CDs, DVDs, USB devices etc., required during steady state for initial ESD environment.

Let Per t=cost of peripherals, such as printers, cables, toner cartridges, etc., during transition for initial ESD environment.

Let Per s=cost of peripherals, such as printers, cables, toner cartridges, etc., during transition for initial ESD environment.

Let TRef t=cost of refreshing the required number of workstations during the transition period.

Let TRef s=cost of refreshing the required number of workstations during the steady state period.

Then,

HW t is a function of the following costs:

HW t=f (Wkst t, Wkst t-lab, Serv t, Serv t-lab, Med t, Per t, TRef t, Tt)

HW s is a function of the following costs:

HW s=f (Wkst s, Wkst s-lab, Serv s, Serv s-lab, Med s, Per s, TRef s, St)

Let ImgSoftt=software licenses required for image creation during transition.

Let ImgSofts=software licenses required for image creation during steady state.

Let PkgLict=cost of software licenses for all copies of software applications required per software package developed during transition.

Let PkgLics=cost of software licenses for all copies of software applications required per software package developed during steady state.

Let PkgToolt=cost of software licenses for all copies of software packaging tool required for creating software packages during transition.

Let PkgTools=cost of software licenses for all copies of software packaging tool required for creating software packages during steady state (may exclude PkgTt).

Let EDInft=cost of software licenses for all copies of software distribution infrastructure tool-set required during transition.

Let EDInfs=cost of software licenses for all copies of software distribution infrastructure tool-set required during steady state (may exclude EDInft).

Let NetMgt=cost of software licenses for all copies of network management tool-set required during transition.

Let NetMgs=cost of software licenses for all copies of network management tool-set required during steady state (may exclude NetMgt).

Let QAt=cost of software licenses for all copies of quality assurance and testing tool-set for testing images and packages during transition.

Let QAs=cost of software licenses for all copies of quality assurance and testing tool-set for testing images and packages during steady state (may exclude QAt).

Then,

SWt is a function of the following costs:

Swt=f (ImgSoftt, PkgLict, PkgToolt, EDInft, NetMgt, QAt, Tt)

SWs is a function of the following costs:

SWs=f (ImgSofts, PkgLics, PkgTools, EDInfs, NetMgs, Qas, St)

Let PkgLowt=cost for developing required number of low complexity packages during transition.

Let PkgLows=cost for developing required number of low complexity packages during steady state.

Let PkgMedt=cost for developing required number of medium complexity packages during transition.

Let PkgLows=cost for developing required number of medium complexity packages during steady state.

Let PkgHight=cost for developing required number of high complexity packages during transition.

Let PkgHighs=cost for developing required number of high complexity packages during steady state.

Let PkgTTypet=coefficient for increase or decrease in packaging labor costs based on selected packaging tool set during transition.

Let PkgTTypes=coefficient for increase or decrease in packaging labor costs based on selected packaging tool set during steady state.

Let PkgTestt=level (low, medium, high) of package testing provided during transition.

Let PkgTests=level (low, medium, high) of package testing provided during steady state.

Let SkillPkgt=skill level (low, intermediate, expert) and other burden requirements of packager creating/testing a software package during transition.

Let SkillPkgs=skill level (low, intermediate, expert) other burden requirements of packager creating/testing a software package during steady state.

Then,

Pkgt is a function of the following costs:

Pkgt=f (PkgLowt, PkgMedt, PkgHight, PkgTTypet, PkgTestt, SkillPkgt)

Pkgs is a function of the following costs:

Pkgs=f (PkgLows, PkgMeds, PkgHighs, PkgTTypes, PkgTests, SkillPkgs)

Let PkgDistNt=number of packages to be distributed during transition.

Let PkgDistNs=number of packages to be distributed during steady state.

Let PkgDistN(i)t=number of times a package (i), where i is a subset of PkgDistNt, must be distributed during transition.

Let PkgDistTarg(i)t=number of target endpoints to which a package (i), where i is a subset of PkgDistNt, must be distributed during transition.

Let PkgDistN(J)s=number of times a package (j), where j is a subset of PkgDistNs, must be distributed during steady state.

Let PkgDistTarg(j)s=number of target endpoints to which a package (j), where j is a subset of PkgDistNs, must be distributed during steady state.

Let EDInfTypet=coefficient for increase or decrease in distribution labor costs based on selected electronic distribution tool set during transition.
Let EDInfTypes=coefficient for increase or decrease in distribution labor costs based on selected electronic distribution tool set during steady state.
Then,
EDt is a function of the following costs:
EDt=f (PkgDistNt, PkgDistN(i)t, PkgDistTarg(i)t, EDInfTypet)
EDs is a function of the following costs:
EDs=f (PkgDistNs, PkgDistN(i)s, PkgDistTarg(i)s, EDInfTypes)
Let ImgTt=total number of workstation Images to be built during transition.
Let ImgTs=total number of workstation Images to be built during steady state.
Let OSt=listing of operating system(s) in scope for the workstation image environment during transition.
Let OSs=listing of operating system(s) in scope for the workstation image environment during steady state.
Let ImgTOSt=number of images per OSt.
Let ImgTOSs=number of images per OSs.
Let NetPrott=listing of network protocols per ImgTt.
Let NetProts=listing of network protocols perImgTs.
Let HWDrt=listing of hardware drivers per ImgTt.
Let HWDrs=listing of hardware drivers per ImgTs.
Let HWModt=listing of hardware manufacturer models to be used for image creation during transition.
Let HWMods=listing of hardware manufacturer models to be used for image creation during steady state.
Let BaseImgAppt=listing of all application by base image, by business unit, and by level of customization (low, medium, high) for each image created during transition.
Let BaseImgApps=listing of all application by base image, by business unit, and by level of customization (low, medium, high) for each image created during steady state.
Let ImgToolt=Tool and methodology used for creating the images in transition.
Let ImgTools=Tool and methodology used for creating the images in steady state.
Let ImgRett=number of images retired during transition.
Let ImgRets=number of images retired during steady state.
Let ImgTestt=level (low, medium, high) of image testing provided during transition.
Let ImgTests=level (low, medium, high) of image testing provided during steady state.
Let SkillImgt=skill level (low, intermediate, expert) and other burden requirements of image creating/testing IT specialist during transition.
Let SkillPkgs=skill level (low, intermediate, expert) and other burden requirements of image creating/testing IT specialist during steady state.
Then,
ImgCt is a function of the following costs:
ImgCt=f (ImgTt, Ost, ImgTOSt, NetPrott, HWDrt, HWModt, BaseImgAppt, ImgToolt, ImgRett, ImgTestt, Let SkillImgt)
ImgCs is a function of the following costs:
ImgCs=f (ImgTs, Oss, ImgTOSs, NetProts, HWDrs, HWMods, BaseImgApps, ImgTools, ImgRets, ImgTests, Let SkillImgs)
Let ImgUpdtt=number of images updates during transition.
Let ImgUpdts=number of images updates during steady state.
Then,
ImgMt is a function of the following costs:
ImgMt=f (ImgCt, ImgUpdtt)
ImgMs=f (ImgCs, ImgUpdts)

Next, the goal-seeking alternatives module 34 will, if needed, relax customer requirements, which the operator indicated as "soft", to meet a "hard" budget constraint. For example, if the original customer requirement is for initial ESD and maintenance of ten applications (and that is a soft requirement), the goal-seeking alternatives module 34 may lower that to eight applications. As another example, if the original customer requirement is for "pushing" the software updates during the maintenance (and that is a soft requirement), the goal-seeking alternatives module 34 may lower that to a "pulling" arrangement which is less expensive. As another example, the software distribution package is very large and requires a high bandwidth to be available over a given expensive distribution period. If this is a unfeasible option to the customer, then as an alternative the bandwidth utilization option may be lowered by a certain amount by the goal seek system in order to distribute small portions of the same package over a longer period of time using low bandwidth in non-peak and less expensive time periods. As another example, it is expensive to perform ten distinct distributions of ten distinct software packages. So, the system may adjust to allow for the bundling of all ten packages into a single mega-package which can be distributed at the same time to all target end point machines. The goal seeking alternatives module 34 is a previously known program such as Excel "Goal Seek" program, Lotus 123 "Goal Seek" program or IFPS program (by Interactive Financial Planning Systems By Comshare Inc.)

Before or after invoking the goal-seeking alternatives module 34, the operator can invoke the sensitivity module 39 to reduce the cost. The sensitivity module 39 allows the operator to change one or a few customer requirements. In response, the sensitivity module 39 will identify the rules which are affected by the change(s), and then notify the cost estimating module 32 to recompute the cost associated with the effected rules. The sensitivity module 39 identifies the affected rules by searching for those costing equations that include the changed customer requirement such as lower number of target end points, low bandwidth utilization decision, bundling of several packages into a single distribution etc. This avoids the need for the cost estimating module 32 to recompute all the cost elements. The sensitivity module 39 is a previously known program such as those used in IBM Lotus 123 spreadsheet program, Microsoft Excel spreadsheet program or Quattro Pro program.

Thus, a knowledge engineering team enters data, facts and rules, for an initial ESD and subsequent maintenance, into the knowledge database 38 using a data encoding program tool. Then, the operator enters the customer requirements for the proposed initial ESD and subsequent maintenance using computer templates generated by the user interface module 30. Then, the cost estimating module 32 applies the data, facts and rules in the knowledge database to the customer requirements to estimate the cost of the initial ESD and subsequent maintenance. Then, if the cost is over budget, the operator can invoke either the goal-seeking alternatives module 34 or the sensitivity module 39. The goal-seeking alternatives module 34 automatically relaxes some of the "soft" customer requirements to reduce the cost to meet any "hard" budget constraints. The sensitivity module 39 allows the operator to change one or a few customer requirements, identifies the rules which are affected by the change(s), and then notifies the cost estimating module 32 to recompute the cost associated with the effected rules. Then, the user interface module 30 displays the results to the user. The user interface module 30 can generate various types of cost estimation proposal reports including display screen reports, HTML reports, pdf files, text file reports, and CSV files based reports. The reports include various cost accounts broken down by cost categories (hardware, software, labor, etc. for initial ESD and maintenance?? The cost data can be further broken down by package creation costs, image creation costs, image deployment costs, package deployment costs, initial ESD infrastructure installation and configuration costs, server support costs etc. Then, the user can vary one or more of the customer requirements, and the cost estimating module 32 will determine the new cost of the initial ESD and subsequent maintenance and present the cost estimation as described above.

Based on the foregoing, a cost estimation program, system and method for estimating the cost of an initial ESD and subsequent maintenance have been disclosed. However, numerous modifications and substitutions can be made without deviating from the scope of the present invention. For example, additional equation parameters can be added to account for various types of hardware, software, labor, infrastructure deployment, and operations management costs related to electronic software distribution and related IT systems management discipline. Therefore, the present invention has been disclosed by way of illustration and not limitation, and reference should be made to the following claims to determine the scope of the present invention.

The invention claimed is:

1. A computer program product for determining a cost of an electronic software distribution, the computer program product comprising:
   one or more computer-readable non-transitory storage devices and program instructions stored on at least one of the one or more storage devices, the program instructions comprising:
   program instructions to determine a first bandwidth cost to distribute a first software package using a first bandwidth, and responsive to user input to reduce the first cost, determine a second bandwidth cost to distribute the first software package using a second, lesser bandwidth, the second bandwidth cost being less than the first bandwidth cost; and
   program instructions to determine a third cost other than bandwidth to distribute the first software package as the plurality of separate software packages, and responsive to user input to reduce the third cost to distribute the first software package as the plurality of separate software packages, determine a fourth cost other than bandwidth for distributing the plurality of separate software packages bundled together as one software package, the fourth cost being less than the third cost based on efficiencies associated with distributing a lesser number of software packages.

2. The computer program product of claim 1 further comprising:
   program instructions, stored on at least one of the one or more storage devices, to determine a fifth cost to push updates to the first software package to computers that previously received the first software package and responsive to user input that it is not necessary to push the updates to the first software package to computers that previously received the first software package, to determine a sixth cost to process pull requests from for the software updates from the computers that previously received the first software package, the sixth cost being less than the fifth cost.

3. The computer program product of claim 2 further comprising:
   program instructions, stored on at least one of the one or more storage devices, to determine a seventh cost for a service provider to maintain the software package and an eighth cost to provide a user of the computers on which the software package is installed with access to a computer program to allow the user instead of the service provider to maintain the software package, the eighth cost being less than the seventh cost.

4. The computer program product of claim 1 further comprising:
   program instructions, stored on at least one of the one or more storage devices, to determine a fifth cost for a service provider to maintain the software package and a sixth cost to provide a user of the computers on which the software package is installed with access to a computer program to allow the user instead of the service provider to maintain the software package, the sixth cost being less than the fifth cost.

5. A computer system for generating a plan for an electronic software distribution ("ESD") of software, the computer system comprising:
   one or more processors, one or more computer-readable memories, one or more computer-readable tangible storage devices, and program instructions stored on at least one of the one or more storage devices for execution by at least one of the one or more processors via at least one of the one or more memories, the program instructions comprising:
   program instructions to determine a first bandwidth cost to distribute a first software package using a first bandwidth, and responsive to user input to reduce the first cost, determine a second bandwidth cost to distribute the first software package using a second, lesser bandwidth, the second bandwidth cost being less than the first bandwidth cost; and
   program instructions to determine a third cost other than bandwidth to distribute the first software package as the plurality of separate software packages, and responsive to user input to reduce the third cost to distribute the first software package as the plurality of separate software packages, determine a fourth cost other than bandwidth for distributing the plurality of separate software packages bundled together as one software package, the fourth cost being less than the third cost based on efficiencies associated with distributing a lesser number of software packages.

6. The computer system of claim 5 further comprising:
   program instructions, stored on at least one of the one or more storage devices, to determine a fifth cost to push updates to the first software package to computers that previously received the first software package and responsive to user input that it is not necessary to push the updates to the first software package to computers that previously received the first software package, to determine a sixth cost to process pull requests from for the software updates from the computers that previously received the first software package, the sixth cost being less than the fifth cost.

7. The computer system of claim 5 further comprising:
   program instructions, stored on at least one of the one or more storage devices for execution by at least one of the one or more processors via at least one of the one or more memories, to determine a seventh cost for a service provider to maintain the software package and an eighth cost to provide a user of the computers on which the software package is installed with access to a computer program to allow the user instead of the service provider to maintain the software package, the eighth cost being less than the seventh cost.

8. The computer system of claim 5 further comprising:
program instructions, stored on at least one of the one or more storage devices for execution by at least one of the one or more processors via at least one of the one or more memories, to determine a fifth cost for a service provider to maintain the software package and a sixth cost to provide a user of the computers on which the software package is installed with access to a computer program to allow the user instead of the service provider to maintain the software package, the sixth cost being less than the fifth cost.

* * * * *